United States Patent
Mixter

(10) Patent No.: US 11,640,534 B2
(45) Date of Patent: May 2, 2023

(54) THRESHOLD TRIGGERED BACK PROPAGATION OF AN ARTIFICIAL NEURAL NETWORK

(71) Applicant: Raytheon Company, Waltham, MA (US)

(72) Inventor: John E. Mixter, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 755 days.

(21) Appl. No.: 16/684,854

(22) Filed: Nov. 15, 2019

(65) Prior Publication Data

US 2021/0150364 A1    May 20, 2021

(51) Int. Cl.
*G06N 3/084*    (2023.01)
*G06N 3/04*    (2023.01)

(52) U.S. Cl.
CPC .............. *G06N 3/084* (2013.01); *G06N 3/04* (2013.01)

(58) Field of Classification Search
CPC ................................. G06N 3/084; G06N 3/04
See application file for complete search history.

(56) References Cited

U.S. PATENT DOCUMENTS

2017/0300811 A1* 10/2017 Merhav .................. G06N 3/084

FOREIGN PATENT DOCUMENTS

WO    WO-2021096590 A1    5/2021

OTHER PUBLICATIONS

Kumar, K., & Abhishek, B. (2012). Artificial neural networks for diagnosis of kidney stones disease (vol. 10). Germany: GRIN Verlag . (Year: 2012).*
Zhu, J., Wang, H., Hovy, E., & Ma, M. (2010). Confidence-based stopping criteria for active learning for data annotation. ACM Transactions on Speech and Language Processing (TSLP), 6(3), 1-24. (Year: 2010).*
"International Application Serial No. PCT US2020 050889, International Search Report dated Dec. 18, 2020", 2 pgs.
"International Application Serial No. PCT US2020 050889, Written Opinion dated Dec. 18, 2020", 6 pgs.
Angela, Jiang H, "Accelerating Deep Learning by Focusing on the Biggest Losers", Arxiv.Org, Cornell University Library, 201 Olin Library Cornell University Ithaca, NY 14853, (Oct. 2, 2019).

(Continued)

*Primary Examiner* — Ying Yu Chen
*Assistant Examiner* — Lokesha G Patel
(74) *Attorney, Agent, or Firm* — Schwegman Lundberg & Woessner, P.A.

(57) ABSTRACT

Backpropagation of an artificial neural network can be triggered or based on input data. The input data are received into the artificial neural network, and the input data are forward propagated through the artificial neural network, which generates output values at classifier layer perceptrons of the network. Classifier layer perceptrons that have the largest output values after the input data have been forward propagated through the artificial neural network are identified. The output difference between the classifier layer perceptrons that have the largest output values is determined. It is then determined whether the output difference transgresses a threshold, and if the output difference does not transgress a threshold, the artificial neural network is backpropagated.

18 Claims, 4 Drawing Sheets

(56) References Cited

OTHER PUBLICATIONS

Jay, Yoon Lee, "Gradient-based inference for networks with output constraints", Arxiv.Org, Cornell University Library, 201 Olin Library Cornell University Ithaca, NY 14853, (Apr. 22, 2019).
"International Application Serial No. PCT/US2020/050889, International Preliminary Report on Patentability dated May 27, 2022", 8 pgs.

* cited by examiner

THRESHOLD TRIGGERED BACK PROPAGATION OF AN ARTIFICIAL NEURAL NETWORK

TECHNICAL FIELD

Embodiments described herein generally relate to a system and method for backpropagating an artificial neural network, and in an embodiment, but not by way of limitation, a threshold triggered backpropagation of an artificial neural network.

BACKGROUND

Artificial neural networks consist of many layers. These layers, regardless of type (e.g., input versus classifier), can be thought of as just connections and weights. Each layer has input from a previous layer or connection and weights associated with that input. Layer types differ only in how the outputs of one layer are connected to the inputs of the next layer.

Artificial neural networks can be trained to implement artificially intelligent processes and functions that can predict many things. Artificial neural network training and prediction can be distilled down to simple multiply and accumulation operations. During prediction, also known as forward propagation, the sums of the multiply and accumulate operations are fed into activation functions that inject nonlinearity into the network. During training, also known as backpropagation, the derivative of the activation functions along with the multiplied inputs and weights, and the resulting accumulated sums, are used to determine the perceptron output error. It is this error that is used to adjust perceptron input weights allowing the network to be trained.

In typical artificial neural network training regimes, the network is backpropagated for every set of input data and/or is based on whether the classifier made a correct prediction. Currently, there are several ways to determine whether a network made a correct prediction and should be backpropagated. For example, a mean squared error can be calculated for each set of input data that is forward propagated through the network. If the mean squared error meets a threshold, then the network is backpropagated. Also, the threshold, which is a hyper parameter, must be swept until the threshold that works best for a given data set is determined. Irrespective of how the determination is made of whether to backpropagate, the sweeping or backpropagation itself consumes a tremendous amount of computing resources.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

One or more embodiments significantly reduce artificial neural network training time by backpropagating the input training data only if the classifier layer of the network cannot make a prediction. For example, if the network cannot determine whether the input datum represents the numeral "1" or the numeral "7," then the network cannot make a prediction and the network is backpropagated. That is, the inventor has determined that contrary to commonly accepted protocol, backpropagation does not need to be executed for every input of training data. And if backpropagation is only performed when absolutely needed, training time can be significantly reduced, thereby easing the processing burden of implementing and executing artificial neural networks. Consequently, one or more embodiments determine when backpropagation must be performed based only on the classifier layer making a "no prediction" determination.

Figure 1A:
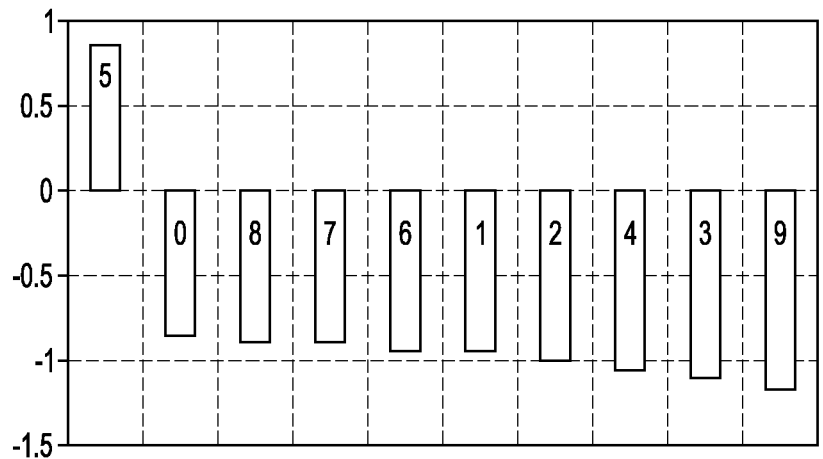
FIGS. 1A, 1B, and 1C are bar graphs illustrating examples of perceptron outputs.
Figure 1B:
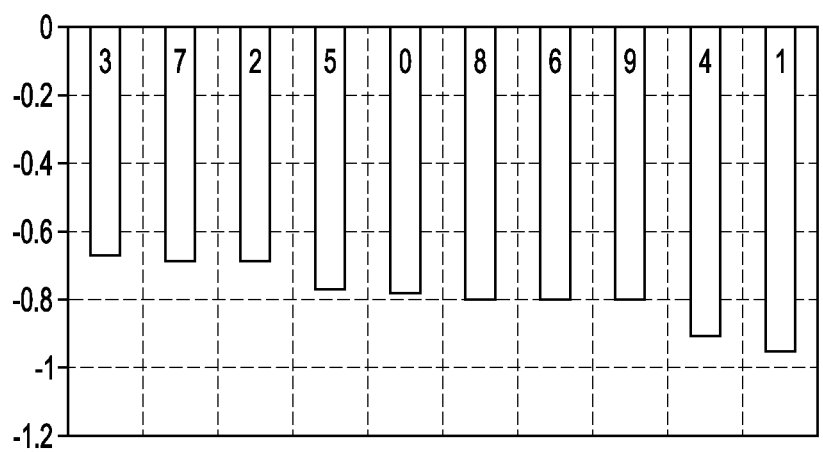
Figure 1C:
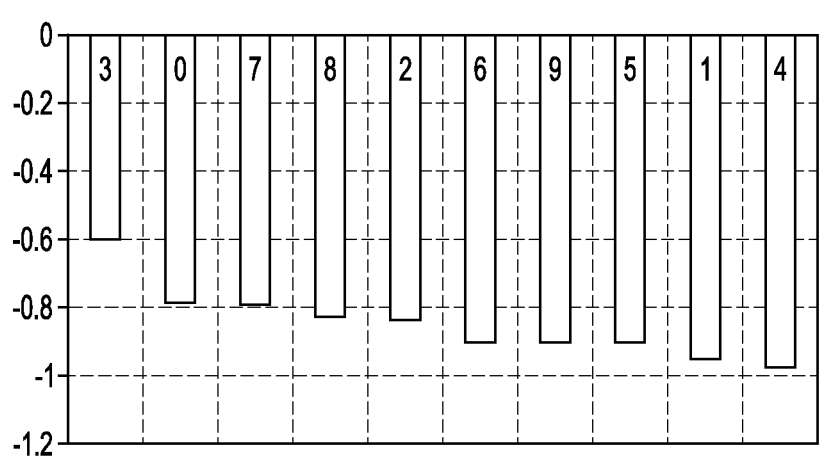

FIGS. 1A, 1B, and 1C are bar graphs illustrating examples of comparisons of perceptron outputs. In particular, FIGS. 1A, 1B, and 1C are perceptron outputs for an MNIST (Modified National Institute of Standards and Technology) classifier. In an embodiment, if the difference between the two largest outputs for a set of input data exceeds a threshold, a prediction can be made. That is, since the difference between the largest output and the next largest output is not insubstantial, one can be confident in making a prediction based on the largest output. Otherwise, a prediction cannot be made and a "cannot predict" state is reported. For example, referring to FIG. 1A, the two largest outputs are for the digits 5 (approximately 0.8) and 0 (approximately −0.8). Similarly, referring to FIG. 1C, the two largest outputs are for the digits 3 (approximately −0.6) and 0 (approximately −0.8). In contrast, referring to FIG. 1B, the two largest outputs are for the digits 3 (approximately −0.7) and 7 (approximately −0.7). If the threshold for these sets of input data is 0.1, the input data for FIGS. 1A and 1C generate output differences that exceed the 0.1 threshold (1.6 and 0.2 respectively), and the input data for FIG. 1B does not generate an output difference that exceeds the threshold (0.0). It is noted that in an embodiment, whether the prediction is correct or not has no impact on whether backpropagation is executed.

Figure 2:
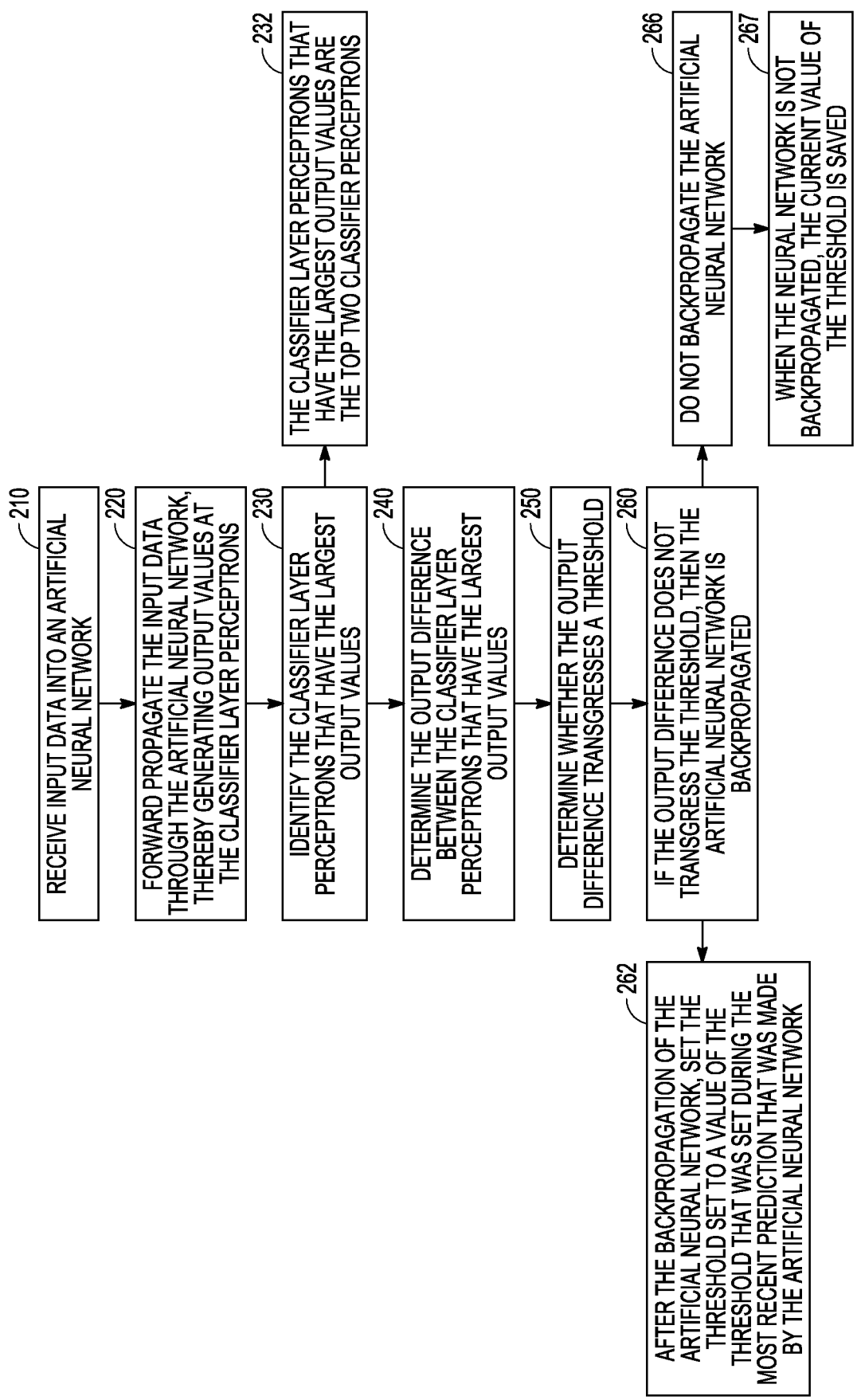
FIG. 2 is diagram illustrating a process for a threshold-determined backpropagation of an artificial neural network.
Figure 3:
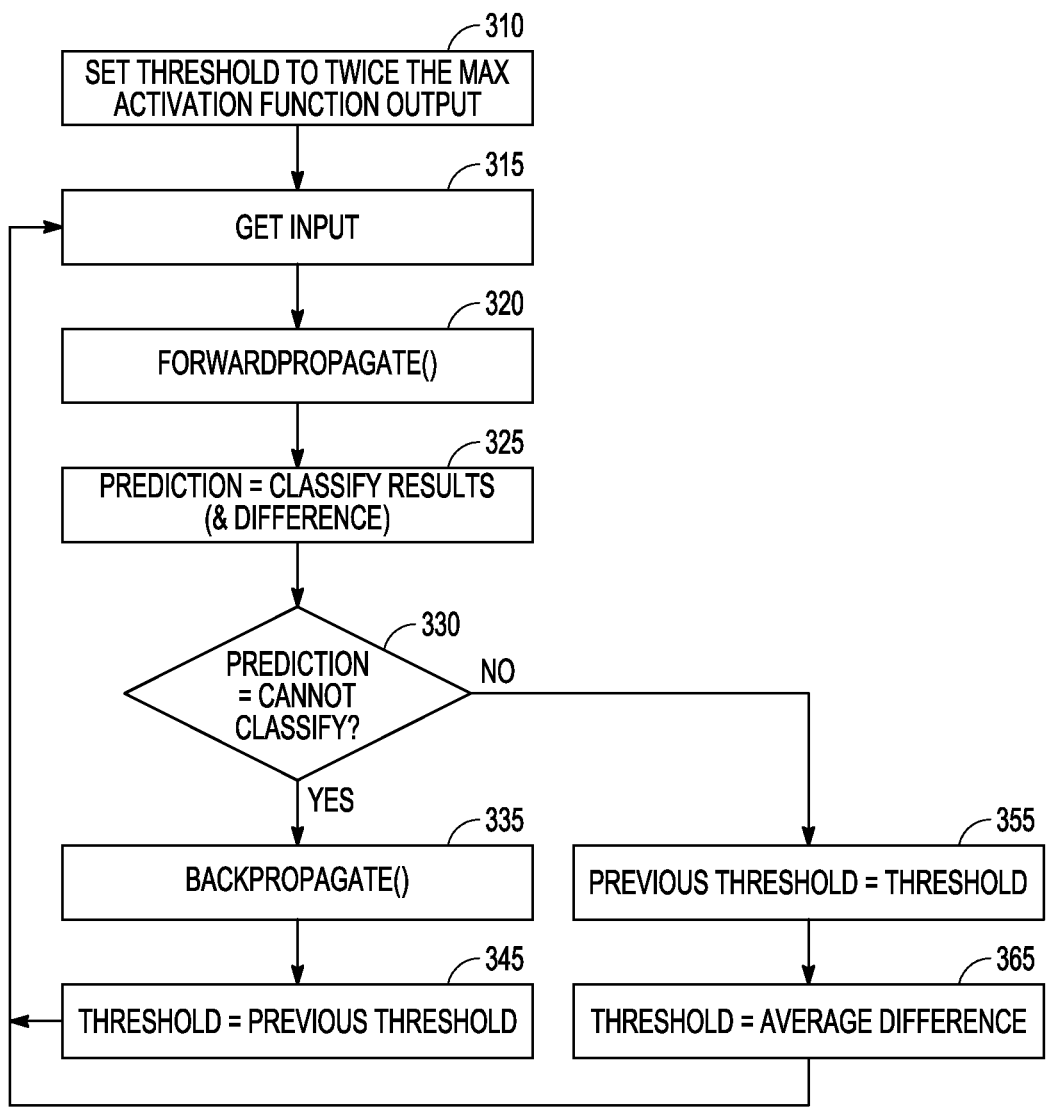
FIG. 3 is another diagram illustrating a process for a threshold-determined backpropagation of an artificial neural network.

FIGS. 2 and 3 are diagrams illustrating a process for a threshold-determined backpropagation of an artificial neural network. FIGS. 2 and 3 include process blocks 210-267 and 310-365 respectively. Though arranged substantially serially in the examples of FIGS. 2 and 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 2, at 210, input data are received into the artificial neural network. At 220, the input data are forward propagated through the artificial neural network. As is well known in the art, this forward propagation of the input data through the artificial neural network generates output values at the classifier layer perceptrons of the artificial neural network.

At 230, the classifier layer perceptrons that have the largest output values after the input data have been forward propagated through the artificial neural network are identified. It is noted at 232 that, in an embodiment, the classifier layer perceptrons that have the largest output values are the top two output classifier perceptrons. For example, if three classifier perceptrons have output values of 1.8, 1.3, and 0.9 (and the remainder of the classifier perceptrons have outputs that are less than 0.0), then the classifier perceptrons that have the 1.8 and 1.3 outputs are the perceptrons that are selected.

At 240, the output difference between the classifier layer perceptrons that have the largest output values is determined. Then, at 250, it is determined whether the output difference transgresses a threshold, and at 260, if the output difference does not transgress the threshold, then the artificial neural network is backpropagated. In an embodiment, the threshold is set to a maximum value that an activation function of the artificial neural network can generate. When a perceptron saturates its activation function, the network is unable to further learn. Consequently, simply put, in an embodiment, if the difference between the two largest outputs of the input data are not large enough, the network cannot make a prediction about the input data (e.g., the network cannot be certain if the input data represented a "3" or an "8,"), and since the network cannot make a prediction, the network should be trained or backpropagated.

As indicated at 262, after the backpropagation of the artificial neural network, the threshold is set to a value of the threshold that was set during the most recent prediction that was made by the artificial neural network. This is further illustrated and discussed below and in connection with the discussion of FIG. 3.

When the output difference transgresses the threshold, then as indicated at 266, the artificial neural network is not backpropagated. That is, the network can make a prediction, and since the network can make a prediction there is not an urgent need to backpropagate or train the network. As indicated at 267, when the neural network is not backpropagated, the current value of the threshold is saved. This saved current threshold value is used in the next backpropagation of the artificial neural network. Then at 268, the value of the threshold is set to a running average of the two classifier layer perceptrons that have the largest output values. For example, referring again to FIGS. 1A and 1C, that is, the two examples in FIG. 1 wherein the output difference transgresses the threshold and there is therefore no backpropagation, the average of the two highest outputs is 0.05 ((0.8+−0.7)/2) for FIG. 1A, and then for the second set of input data of FIG. 1C, the running average of the output of the two highest outputs is −0.325((0.8+−0.7+−0.6+−0.8)/4).

In the course of training the network with multiple sets of input data, the threshold floats around depending on how the network is doing, as evidenced by the difference between the two classifiers with the largest outputs. Initially, the threshold is set very high to a maximum value so that it is certain that the threshold is not met, and a backpropagation will be executed. In an embodiment, the maximum threshold value is set to 1.17159, which is from a non-linear squashing activation function of tan h( ), and is the maximum value that the tan h( ) function can generate. By setting the threshold to this initial maximum value, the network does not permit the output of any classifier perceptron to exceed the threshold. As the training progresses, the threshold is constantly adjusted until it stabilizes. This results in the backpropagation executing well below 100% of the time. As the network starts to learn from the multiple input data sets, the running average of the differences between the two classifiers with the largest outputs becomes larger, which results in the threshold becoming larger (365), and a larger threshold results in fewer backpropagation executions. Eventually, after multiple training runs of the network, the threshold settles down to a value at which backpropagation executions will be at a lowest value. As noted, a purpose of selective backpropagation is to reduce processing cycles and hence reduce power usage by the neural network.

FIG. 3 is another diagram illustrating an example embodiment of a process for a threshold-determined back propagation of an artificial neural network. At 310, a threshold is initially set so all training data inputs trigger backpropagation. At 315, input data are received into the artificial neural network, and at 320, the input data are forward propagated through the network. At 325, a prediction for the input data is made. This prediction is based on the classification of the data by the network and differences between the actual results based on the input data and the expected results for the input data. More specifically, as noted above, a prediction or classification can be made if the difference between the two classifier perceptrons with the largest outputs is greater than the threshold. At 330, it is determined whether the neural network can predict or classify the input data or not based on this output difference.

If the input data cannot be classified, then backpropagation occurs beginning at 335. At 345, the threshold value is updated. Specifically, the threshold value is set to the value of the threshold at the beginning of the most recent data input that did not trigger a backpropagation (355).

If it is determined at 330 that the input data can be classified, then at 355 the threshold value is saved for the next backpropagation (345), and at 365, the threshold is recalculated. Specifically, the threshold is set to a running average of the differences between the two largest classifier level outputs for each set of input data. After operations 345 and 365, further input data, if available, are received at 315. The previous threshold (355) is a marker of the current threshold; it saves the current threshold before the threshold is recalculated. The saved threshold is then used the next time that backpropagation is executed. The purpose of this is that if the current threshold was not saved and used in the next backpropagation, the threshold would be different, and it could not be determined if the network did better or worse from one training data to another. Therefore, the threshold is only changed when it needs to be changed, that is, when no prediction can be made. Consequently, the network only executes a backpropagation when it cannot make a prediction, and the network cannot make a prediction when the two largest classifier outputs does not exceed the threshold.

Figure 4:
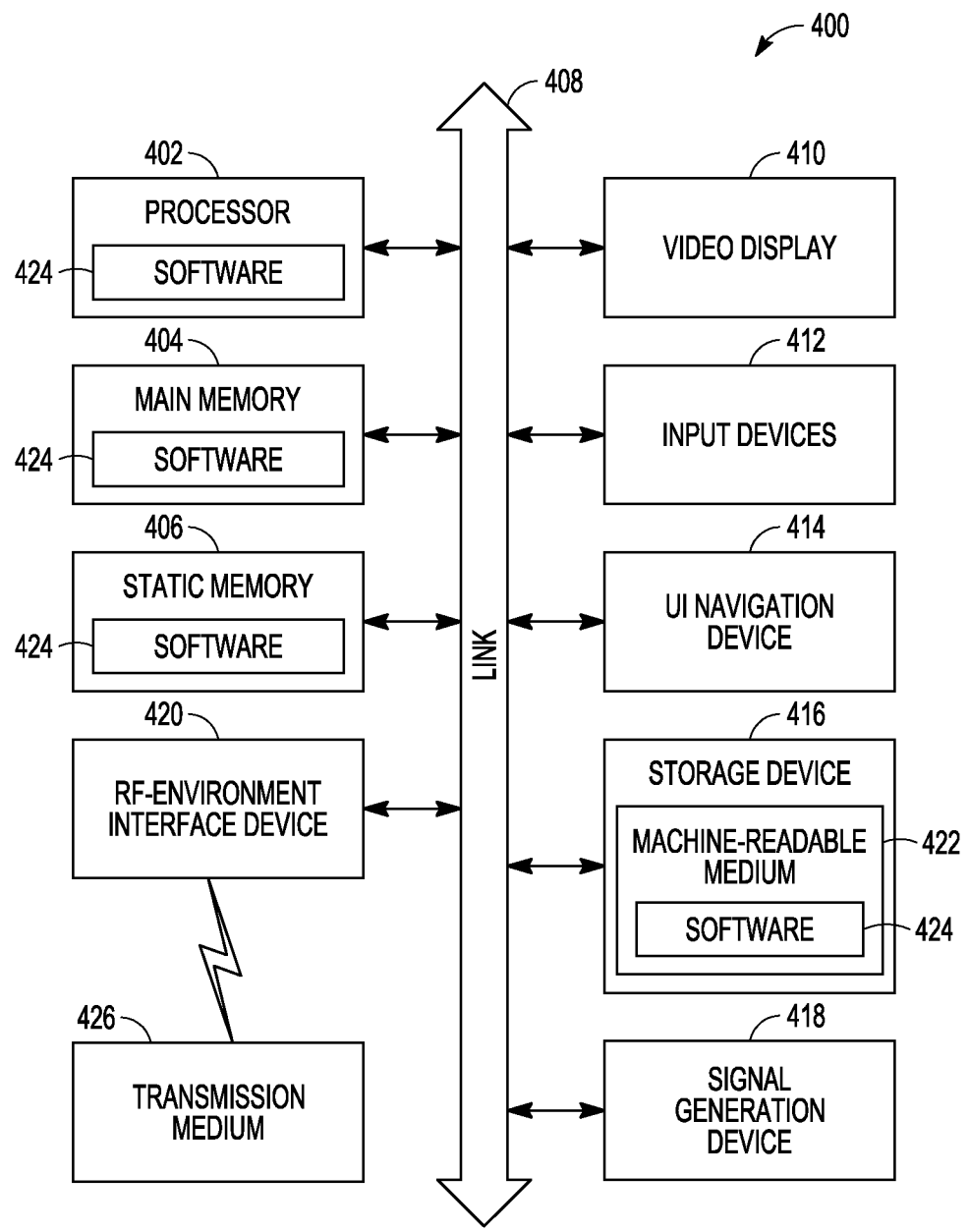
FIG. 4 is a block diagram of a computer architecture upon which one or more embodiments of the present disclosure can execute.

FIG. 4 is a block diagram illustrating a computing and communications platform 400 in the example form of a general-purpose machine on which some or all of the operations of FIGS. 2 and 3 may be carried out according to various embodiments. In certain embodiments, programming of the computing platform 400 according to one or more particular algorithms produces a special-purpose machine upon execution of that programming. In a networked deployment, the computing platform 400 may operate in the capacity of either a server or a client machine in server-client network environments, or it may act as a peer machine in peer-to-peer (or distributed) network environments.

Example computing platform 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computing platform 400 may further include a video display unit 410, input devices 412 (e.g., a keyboard, camera, microphone), and a user interface (UI) navigation device 414 (e.g., mouse, touchscreen). The computing platform 400 may additionally include a storage device 416 (e.g., a drive unit), a signal generation device 418 (e.g., a speaker), and a RF-environment interface device (RFEID) 420.

The storage device 416 includes a non-transitory machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computing platform 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 420 includes radio receiver circuitry, along with analog-to-digital conversion circuitry, and interface circuitry to communicate via link 408 according to various embodiments. Various form factors are contemplated for RFEID 420. For instance, RFEID may be in the form of a wideband radio receiver, or scanning radio receiver, that interfaces with processor 402 via link 408. In one example, link 408 includes a PCI Express (PCIe) bus, including a slot into which the NIC form-factor may removably engage. In another embodiment, RFEID 420 includes circuitry laid out on a motherboard together with local link circuitry, processor interface circuitry, other input/output circuitry, memory circuitry, storage device and peripheral controller circuitry, and the like. In another embodiment, RFEID 420 is a peripheral that interfaces with link 408 via a peripheral input/output port such as a universal serial bus (USB) port. RFEID 420 receives RF emissions over wireless transmission medium 426. RFEID 420 may be constructed to receive RADAR signaling, radio communications signaling, unintentional emissions, or some combination of such emissions.

Examples, as described herein, may include, or may operate on, logic or a number of components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process to backpropagate an artificial neural network comprising: receiving input data into the artificial neural network;
   forward propagating the input data through the artificial neural network, thereby generating output values at classifier layer perceptrons of the artificial neural network;
   identifying classifier layer perceptrons having largest output values after the input data have been forward propagated through the artificial neural network to the classifier layer perceptrons;
   determining an output difference between the classifier layer perceptrons having a largest output value and a next largest output value;
   determining the output difference does not transgress a threshold; and
   training the artificial neural network by back propagating the artificial neural network when the output difference does not transgress the threshold.

2. The process of claim 1, comprising identifying two classifier layer perceptrons having the largest output values.

3. The process of claim 1, wherein the threshold is set to a maximum value that an activation function of the artificial neural network can generate.

4. The process of claim 1, wherein backpropagating the artificial neural network comprises setting the threshold to a value of a second threshold, the second threshold being set during a most recent prediction by the artificial neural network.

5. The process of claim 1, comprising refraining from backpropagating the artificial neural network when the output difference transgresses the threshold.

6. The process of claim 5, comprising:
   saving a value of the threshold for use in a next backpropagation of the artificial neural network; and
   setting the value of the threshold equal to a running average of two classifier layer perceptrons having the largest output values.

7. A non-transitory machine-readable medium comprising instructions that when executed by a processor execute a process to backpropagate an artificial neural network comprising:
   receiving input data into the artificial neural network;
   forward propagating the input data through the artificial neural network, thereby generating output values at classifier layer perceptrons of the artificial neural network;
   identifying classifier layer perceptrons having largest output values after the input data have been forward propagated through the artificial neural network to the classifier layer perceptrons;
   determining an output difference between the classifier layer perceptrons having a largest output value and a next largest output value;
   determining whether the output difference transgresses a threshold; and
   training the artificial neural network by back propagating the artificial neural network when the output difference does not transgress the threshold.

8. The non-transitory machine-readable medium of claim 7, comprising instructions for identifying two classifier layer perceptrons having the largest output values.

9. The non-transitory machine-readable medium of claim 7, comprising instructions for setting the threshold to a maximum value that an activation function of the artificial neural network can generate.

10. The non-transitory machine-readable medium of claim 7, wherein backpropagating the artificial neural network comprises setting the threshold to a value of a second threshold, the second threshold being set during a most recent prediction by the artificial neural network.

11. The non-transitory machine-readable medium of claim 7, comprising instructions for refraining from backpropagating the artificial neural network when the output difference transgresses the threshold.

12. The non-transitory machine-readable medium of claim 11, comprising instructions for: saving a value of the threshold for use in a next backpropagation of the artificial neural network; and setting the value of the threshold equal to a running average of two classifier layer perceptrons having the largest output values.

13. A system comprising:
   a computer processor; and
   a computer memory coupled to the computer processor;
   wherein the computer processor is operable for:
   receiving input data into an artificial neural network;
   forward propagating the input data through the artificial neural network, thereby generating output values at classifier layer perceptrons of the artificial neural network;
   identifying classifier layer perceptrons having largest output values after the input data have been forward propagated through the artificial neural network to the classifier layer perceptrons;
   determining an output difference between the classifier layer perceptrons having a largest output value and a next largest output value;
   determining whether the output difference transgresses a threshold; and
   training the artificial neural network by backpropagating the artificial neural network when the output difference does not transgress the threshold.

14. The system of claim 13, wherein the computer processor is operable for identifying two classifier layer perceptrons having the largest output values.

15. The system of claim 13, wherein the threshold is set to a maximum value that an activation function of the artificial neural network can generate.

16. The system of claim 13, wherein backpropagating the artificial neural network comprises setting the threshold to a value of a second threshold, the second threshold being set during a most recent prediction by the artificial neural network.

17. The system of claim 13, wherein the computer processor is operable for refraining from backpropagating the artificial neural network when the output difference transgresses the threshold.

18. The system of claim 17, wherein the computer processor is operable for:
- saving a value of the threshold for use in a next backpropagation of the artificial neural network; and
- setting the value of the threshold equal to a running average of two classifier layer perceptrons having the largest output values.

\* \* \* \* \*

UNITED STATES PATENT AND TRADEMARK OFFICE
CERTIFICATE OF CORRECTION

PATENT NO. : 11,640,534 B2
APPLICATION NO. : 16/684854
DATED : May 2, 2023
INVENTOR(S) : John E. Mixter Page 1 of 1

It is certified that error appears in the above-identified patent and that said Letters Patent is hereby corrected as shown below:

In the Specification

In Column 3, Line 57, delete "tan h()," and insert --tanh(),-- therefor

In Column 3, Line 58, delete "tan h()" and insert --tanh()-- therefor

In the Claims

In Column 7, Line 27, in Claim 1, after "comprising:", insert a linebreak

In Column 8, Line 36, in Claim 12, after "for:", insert a linebreak

In Column 8, Line 38, in Claim 12, after "and", insert a linebreak

Signed and Sealed this
Seventeenth Day of September, 2024

Katherine Kelly Vidal
*Director of the United States Patent and Trademark Office*